(12) United States Patent
Labonte et al.

(10) Patent No.: US 9,395,748 B1
(45) Date of Patent: Jul. 19, 2016

(54) METHOD AND SYSTEM FOR TIME SYNCHRONIZATION IN A NETWORK DEVICE

(71) Applicant: Arista Networks, Inc., Santa Clara, CA (US)

(72) Inventors: François Labonte, Santa Clara, CA (US); Deepak Sebastian, San Francisco, CA (US)

(73) Assignee: Arista Networks, Inc., Santa Clara, CA (US)

( * ) Notice: Subject to any disclaimer, the term of this patent is extended or adjusted under 35 U.S.C. 154(b) by 0 days.

(21) Appl. No.: 14/640,732

(22) Filed: Mar. 6, 2015

(51) Int. Cl.
*H04L 7/00* (2006.01)
*G06F 1/12* (2006.01)
*G06F 1/14* (2006.01)

(52) U.S. Cl.
CPC ..... *G06F 1/12* (2013.01); *G06F 1/14* (2013.01)

(58) Field of Classification Search
CPC ..... H04L 41/0803; H04L 7/0008; H04L 7/02; H04L 7/0331; H04L 7/0083; H04J 3/0685; G06F 1/04; G06F 1/12; G06F 1/14
USPC ............. 375/354, 357; 370/465, 469, 503
See application file for complete search history.

(56) References Cited

U.S. PATENT DOCUMENTS

| | | | | |
|---|---|---|---|---|
| 5,432,791 A * | 7/1995 | Gancarcik | ............. | H04J 3/0685 370/358 |
| 6,760,339 B1 * | 7/2004 | Noel | ......................... | G06F 1/14 361/788 |
| 7,143,153 B1 * | 11/2006 | Black | .................. | H04L 41/0681 709/220 |
| 7,206,367 B1 * | 4/2007 | Moore | .................... | H04L 12/66 348/515 |
| 7,263,597 B2 * | 8/2007 | Everdell | ................ | H04L 47/125 709/201 |
| 2014/0301513 A1 * | 10/2014 | Takahashi | ................. | G06F 1/12 375/354 |
| 2015/0381299 A1 * | 12/2015 | Yang | ..................... | H04J 3/0697 370/509 |

* cited by examiner

*Primary Examiner* — Khanh C Tran
(74) *Attorney, Agent, or Firm* — Osha Liang LLP (57) ABSTRACT

A method for distributing time information in network devices. The method includes sending a first clock signal from a first system control device (SCD) to a PLL chip, sending a first time of day (TOD) from the first SCD to a line card system control device (LC-SCD), sending a second clock signal from a second SCD to the PLL chip and sending a second TOD from the second SCD to the LC-SCD. The method further includes synchronizing a third clock signal, generated by the PLL chip, to the first clock signal, if the first SCD is operational. The method further includes sending the third clock signal to a network chip, deriving, using the third clock signal, a first network-chip-internal clock signal and applying the first network-chip-internal clock signal to increment a network-chip-internal TOD to obtain a third TOD. The method further includes synchronizing the third TOD to the first TOD.

18 Claims, 6 Drawing Sheets

METHOD AND SYSTEM FOR TIME SYNCHRONIZATION IN A NETWORK DEVICE

BACKGROUND

Network devices such as switches or multilayer switches are network devices that are used to manage the flow of data across a network of physically connected network devices. Network devices require an accurate time base to time-stamp data transactions, for example, to perform latency measurements.

SUMMARY

In general, in one aspect, the invention relates to a method for distributing time information in network devices. The method includes sending a first clock signal from a first system control device (SCD) to a PLL chip, sending a first time of day (TOD) from the first SCD to a line card system control device (LC-SCD) on a line card, sending a second clock signal from a second SCD to the PLL chip and sending a second TOD from the second SCD to the LC-SCD. The method further includes synchronizing a third clock signal, generated by the PLL chip, to the first clock signal, wherein the first system control device is operational. The method further includes sending the third clock signal to at least one network chip of a plurality of network chips, deriving, using the third clock signal, a first network-chip-internal clock signal on the at least one network chip and applying the first network-chip-internal clock signal to increment a network-chip-internal TOD on the at least one network chip to obtain a third TOD. The method further includes sending, from the LC-SCD, the first TOD to the at least one network chip, calculating, by the at least one network chip, a first difference between the third TOD and the first TOD; and applying the first difference to synchronize the third TOD to the first TOD.

In general, in one aspect, the invention relates to a network device, the network device comprising a first system control device (SCD), a second SCD, a PLL chip, a line card system control device (LC-SCD), a plurality of network chips and a plurality of ports. The first SCD sends a first clock signal to the PLL chip, the first SCD sends a first time of day (TOD) to the LC-SCD on a line card, the second SCD sends a second clock signal to the PLL chip and the second SCD sends a second TOD to the LC-SCD. The PLL chip generates a third clock signal and synchronizes the third clock signal to the first clock signal, wherein the first system control device is operational. The PLL chip sends the third clock signal to at least one network chip of the plurality of network chips, the at least one network chip derives, using the third clock signal, a first network-chip-internal clock signal; and applies the first network-chip-internal clock signal to increment a network-chip-internal TOD to obtain a third TOD. Further, the LC-SCD sends the first TOD to the at least one network chip, the at least one network chip calculates a first difference between the third TOD and the first TOD and the at least one network chip applies the first difference to the third TOD in order to synchronize the third TOD to the first TOD.

DETAILED DESCRIPTION

Specific embodiments of the invention will now be described in detail with reference to the accompanying figures. In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1-4B, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to a method and system for time synchronization in a network device. More specifically, one or more embodiments of the invention include functionality to distribute a time base including a clock signal and a time of day signal throughout a network device to ensure that, regardless of where in the network device an operation is performed, the same time base may be applied.

The following description describes embodiments of the invention in which the network devices are switches. However, the invention is not limited to switches; rather embodiments of the invention may be extended to include other network devices (e.g., multi-layer switches, routers, etc.).

Figure 1:
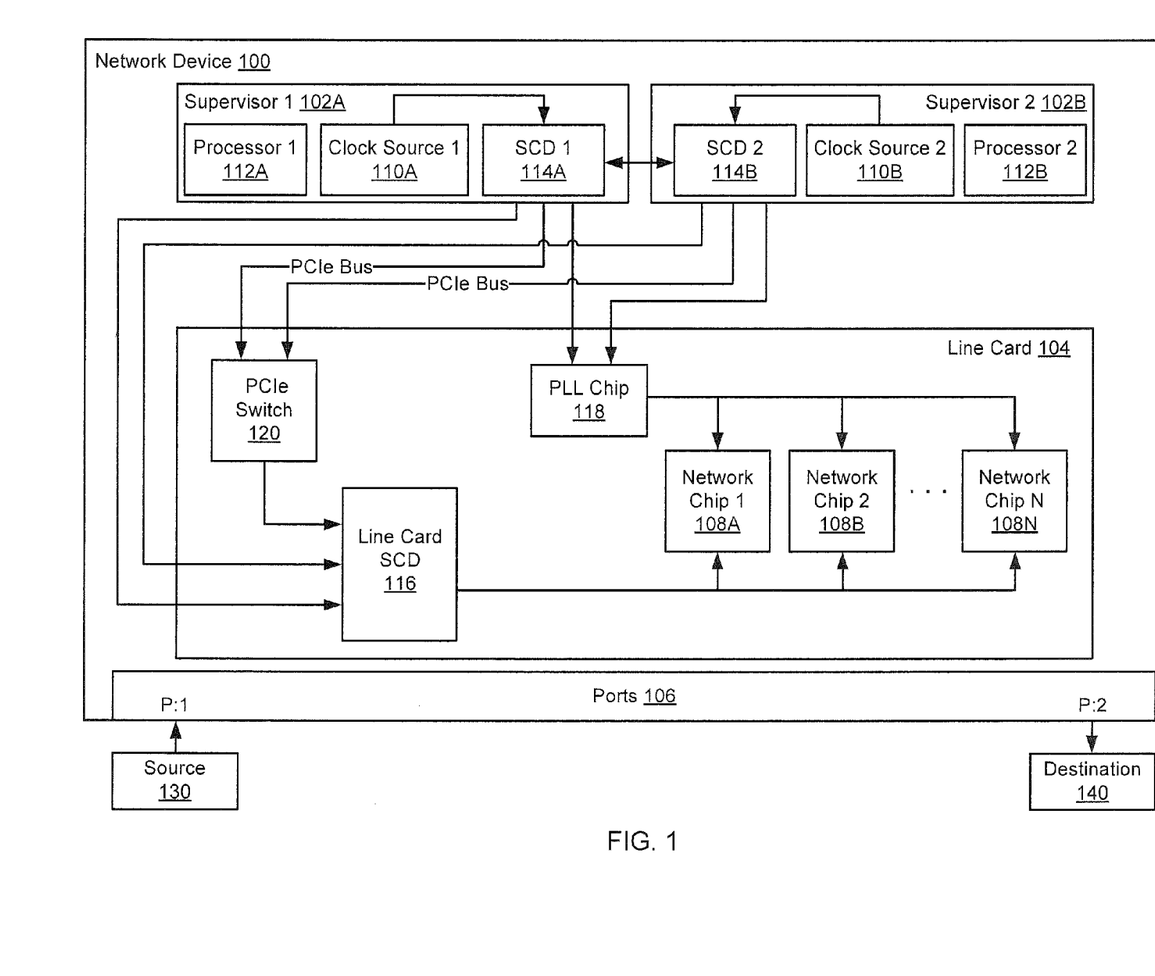
FIG. 1 shows a network device in accordance with one or more embodiments of the invention.

FIG. 1 shows a network device (100) in accordance with one or more embodiments of the invention. In one or more embodiments of the invention, the network device (100) includes computer software and hardware configured to send packets to and receive packets from other network devices and/or computing devices. A packet is a unit of data capable of being sent through a computer network using identifying information encapsulated in the packet. In one embodiment of the invention, packets are binary data encapsulated within a packet header that identifies, at least, where the packet came from and to where it is to be sent. In one embodiment of the invention, the network device (100) may connect to other networking devices (not shown), such as switches or routers, and/or computing devices (not shown), such as servers or workstations. In one embodiment of the invention, the network device (100) may include a supervisor 1 (102A), a supervisor 2 (102B), one or more line cards (104), and multiple ports (106). Each of these components is described below.

In one embodiment of the invention, the ports (106) provide the physical interfaces to other network devices or computing devices (not shown). The network device (100) is configured to receive packets via the ports (106) of the network device (100), to process the packets in accordance with one or more embodiments of the invention, and to send the packets via the ports (106) of the network device (100). Incoming packets from a source (130), e.g., another networking device or a computing device such as a server, may be received by the network device (100) via one of the multiple ports (106), and outgoing packets may be sent by the network device (100) to a destination (140), e.g., another networking device or a computing device such as a server, via another port of the multiple ports (106). Network chips (108A-N) on the line card(s) (104) interface with the ports (106) and process the packets in accordance with one or more network protocols.

In one embodiment of the invention, supervisor 1 (102A) and supervisor 2 (102B) may implement redundant sources of an accurate time base for the network device (100). The time base may, for example, include a time of day (TOD) and a clock (CLK). In one or more embodiments of the invention, one supervisor may be the active supervisor, and the other supervisor may be the backup supervisor. For example, supervisor 1 (102A) may be the default active supervisor, and in case supervisor 1 fails, supervisor 2 may become the active supervisor. Both supervisors (102A, 102B) may include internal clock sources (110A, 110B). In one embodiment of the invention, the clock sources (110A, 110B) may be crystal oscillators that generate fixed frequency clock signals CLK 1 and CLK 2, respectively. The frequencies of CLK 1 and CLK 2 may be the same. For example, the crystal oscillators may generate 25 MHz clock signals. In one or more embodiments of the invention, both supervisors (102A, 102B) may include processors (112A, 112B) that may be central processing units (CPUs). In one or more embodiments of the invention, both supervisors (102A, 102B) may further include system control devices SCD 1 and SCD 2 (114A, 114B) that may be field-programmable gate arrays (FPGAs). SCD 1 and SCD 2 (114A, 114B) may implement time bases that may be updated by the CPUs (112A, 112B). In one embodiment of the invention, SCD 1 (114A) and SCD 2 (114B) are interconnected to enable synchronization of their respective time bases. In one embodiment of the invention, both SCDs (114A, 114B) may distribute their time base to the line card(s) (104).

In one or more embodiments of the invention, each line card (104) includes network chips (108A-108N), a line card system control device (LC-SCD) (116), a phase-locked loop (PLL) chip (118), and a peripheral component interconnect express (PCIe) switch (120). Each of these components is described below.

The network chips (108A-108N) on the line card(s) (104) interface with the ports (106) and process packets. In one or more embodiments of the invention, the network chips (108A-108N) may use a time of day (TOD), for example, to time-stamp incoming packets received via the ports (106). The TOD may be, for example, the local current time, including seconds, minutes, hours, day, month and year, or it may be limited to a second or a few seconds only. Further, in order to enable accurate time-stamping, the TOD may have nanosecond resolution. Each network chip (108A-108N) may periodically receive a time base including a time of day (TOD) from the line card system control device (LC-SCD) (116) and a clock (CLK) from the PLL chip (118). In one or more embodiments of the invention, the LC-SCD (116) may receive a time of day 1 (TOD 1) from SCD 1 (114A) and a time of day 2 (TOD 2) from SCD 2 (114B). In addition, the LC-SCD (116) may receive, via the PCIe switch (120), status information indicating the currently active SCD from SCD 1 (114A) or SCD 2 (114B), depending on which SCD is active.

The LC-SCD (116) may forward the TOD from the active SCD to the network chips (108A-108N). If SCD 1 (114A) is the active SCD, the LC-SCD (116) forwards TOD 1 to the network chips (108A-108N), and if SCD 2 (114B) is the active SCD, the LC-SCD (116) forwards TOD 2 to the network chips (108A-108N).

In one or more embodiments of the invention, the PLL chip (118) may receive clock signals CLK 1 and CLK 2 from SCD 1 (114A) and SCD 2 (114B), respectively. The PLL chip (118) may generate a PLL clock and synchronize the PLL clock to the default active SCD clock. In one embodiment of the invention, if, for example, the PLL chip (118) receives CLK 1 from the default active SCD, SCD 1 (114A), the PLL clock is synchronized to CLK 1. In absence of a clock signal from the default active SCD, the PLL chip (118) synchronizes the PLL clock to the alternative clock source. In one embodiment of the invention, if, for example, the PLL chip (118) does not receive a CLK 1 signal due to a failing SCD 1 (114A), the PLL chip (118) synchronizes the PLL clock to CLK 2 from SCD 2 (114B). In absence of CLK 1 and CLK 2, the PLL chip (118) may continue to generate the PLL clock without synchronization. The PLL chip (118) may send the PLL clock to the network chips (108A-108N).

In one embodiment of the invention, the internal TOD representation used by SCD 1 (114A) and SCD 2 (114B) may be different from the TOD representation the SCDs send to the network chips (108A-108N) via the line card SCD(s) (114). In one embodiment of the invention, for example, the network chips (108A-108N) have TOD counters ($Chip_{nanosecond}$) limited to 32 bits. At nanosecond time resolution, the capacity of these TOD counters is therefore limited to approximately four seconds. In order to maintain a full-range TOD that includes, for example, seconds, minutes, hours, days, months and years, the SCDs (114A, 114B) therefore may use a different representation of the TOD. In one embodiment of the invention, the TOD of the SCDs (114A, 114B) may be maintained by a counter for nanoseconds ($SCD_{nanosecond}$) that is set to roll over after one billion nanoseconds, i.e. one second, and an additional counter for seconds ($SCD_{second}$). In combination, the counter for nanoseconds and the counter for seconds may maintain a full-range TOD representation at nanosecond resolution.

The two representations of the TOD are initially aligned when the SCD counter for nanoseconds ($SCD_{nanosecond}$), the SCD counter for seconds ($SCD_{second}$) and the network chip counter ($Chip_{nanosecond}$) are all zero.

It may be necessary to reconstruct a full-range TOD from the limited-range TOD of a network chip, for example, when a time stamp is returned from a network chip (108A-108N) to a supervisor (102A, 102B). A full-range, nanosecond-resolution TOD may be reconstructed from a limited-range nanosecond-resolution network chip TOD by combining the network chip TOD with the upper 32 bits of a 64-bit TOD maintained by the SCD, as follows:

$$TOD_{SCD\,nanosecond} = SCD_{second} * 1{,}000{,}000{,}000 + SCD_{nanosecond},$$

where $TOD_{SCD}$ nanosecond is the full-range nanosecond-resolution TOD of the SCD.

For example, assuming a TOD of 10 seconds and 533 nanoseconds, $SCD_{second}$ is 10 seconds and $SCD_{nanosecond}$ is 533 nanoseconds. In the example, $TOD_{SCD\,nanosecond}$ therefore is 10,000,000,533 nanoseconds. The full-length nanosecond-resolution TOD restored from the limited-range nanosecond-resolution network chip TOD, $TOD_{chip\ nanosecond}$ may then be calculated as follows:

$$TOD_{Chip\ nanosecond} = (TOD_{SCD\ nanosecond}\ \&\ (0xffffffff<32)) + Chip_{nanosecond},$$

where $TOD_{SCD\ nanosecond}$ bit-masked by (0xffffffff<32) represents the upper 32 bits of the 64-bit $TOD_{SCD\ nanosecond}$ maintained by the SCD. $TOD_{SCD\ nanosecond}$ bit-masked by (0xffffffff<32), therefore is 8,589,934,592 nanoseconds. $Chip_{nanosecond}$ is the 32-bit network chip TOD counter value. In the example, $Chip_{nanosecond}$ has rolled over twice; the first time at approximately 4 seconds, and the second time at approximately 8 seconds. After the second rollover event, the network chip counter value is $Chip_{nanosecond}$=10,000,000,533−2*32-bit-counter-rollover=1,410,065,941 nanoseconds, where 32-bit-counter-rollover is the counting range of the 32-bit counter, i.e. 32-bit-counter-rollover=4,294,967,296. Therefore, the reconstructed $TOD_{Chip\ nanosecond}$ is 8,589,934,592 nanoseconds+1,410,065,941 nanoseconds=10,000,000,533 nanoseconds.

If a $Chip_{nanosecond}$ returned TOD value is returned from a network chip at a time immediately before a rollover of the $Chip_{nanosecond}$ counter, and the $Chip_{nanosecond}$ TOD value is received by the SCD after the occurrence of the rollover of the $Chip_{nanosecond}$ counter, the calculated $TOD_{chip\ nanosecond}$ is too high by $2^{32}$ nanoseconds. This condition exists when: $TOD_{SCD\ nanosecond}\ \&\ (0xffffffff<32)<Chip_{nanosecond}$. If this condition is true, $2^{32}$ nanoseconds may be subtracted from $TOD_{chip\ nanosecond}$ to obtain the correct $TOD_{chip\ nanosecond}$.

In one or more embodiments of the invention, deterministic delays, for example processing delays, may cause a TOD to be received by a network chip with a delay. The delay may consist of a delay between an SCD sending the TOD and an LC-SCD receiving the TOD, and a delay between the LC-SCD sending the TOD and a network chip receiving the TOD. The delay between the SCD and the LC-SCD is line card-specific, and the delay between the LC-SCD and a network chip is network chip-specific. In one embodiment of the invention, any time stamp information that is returned to the SCD may be adjusted to compensate for these known delays. By taking the aforementioned delays into account, a time stamp evaluated by the SCD is therefore accurate and without offset with respect to the TOD of the SCD, regardless of the transmission delays between the SCD sending the TOD and the network chip receiving the TOD.

One skilled in the art will recognize that the architecture of a network device is not limited to the components shown in FIG. 1. For example, the network device may include processors or memory not shown in FIG. 1. Further, the number of ports, line cards, and network chips may vary depending on the requirements of the network in which it is located without departing from the invention.

Figure 2:
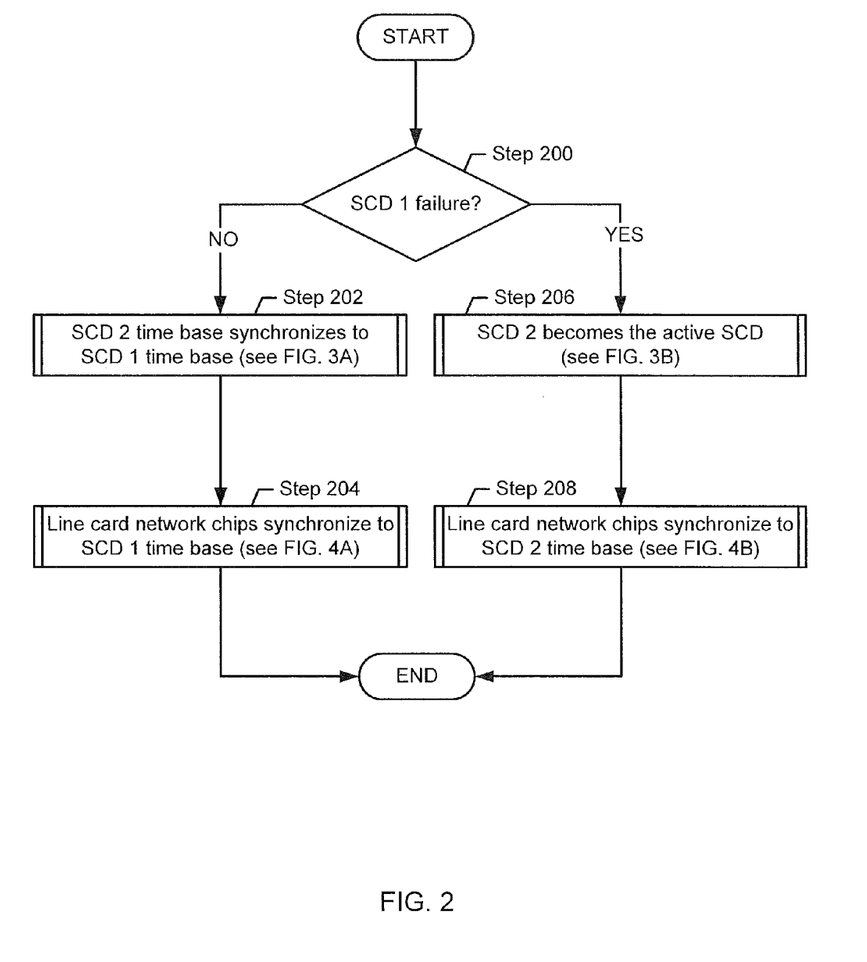
FIG. 2 shows a flowchart in accordance with one or more embodiments of the invention.
Figure 3A:
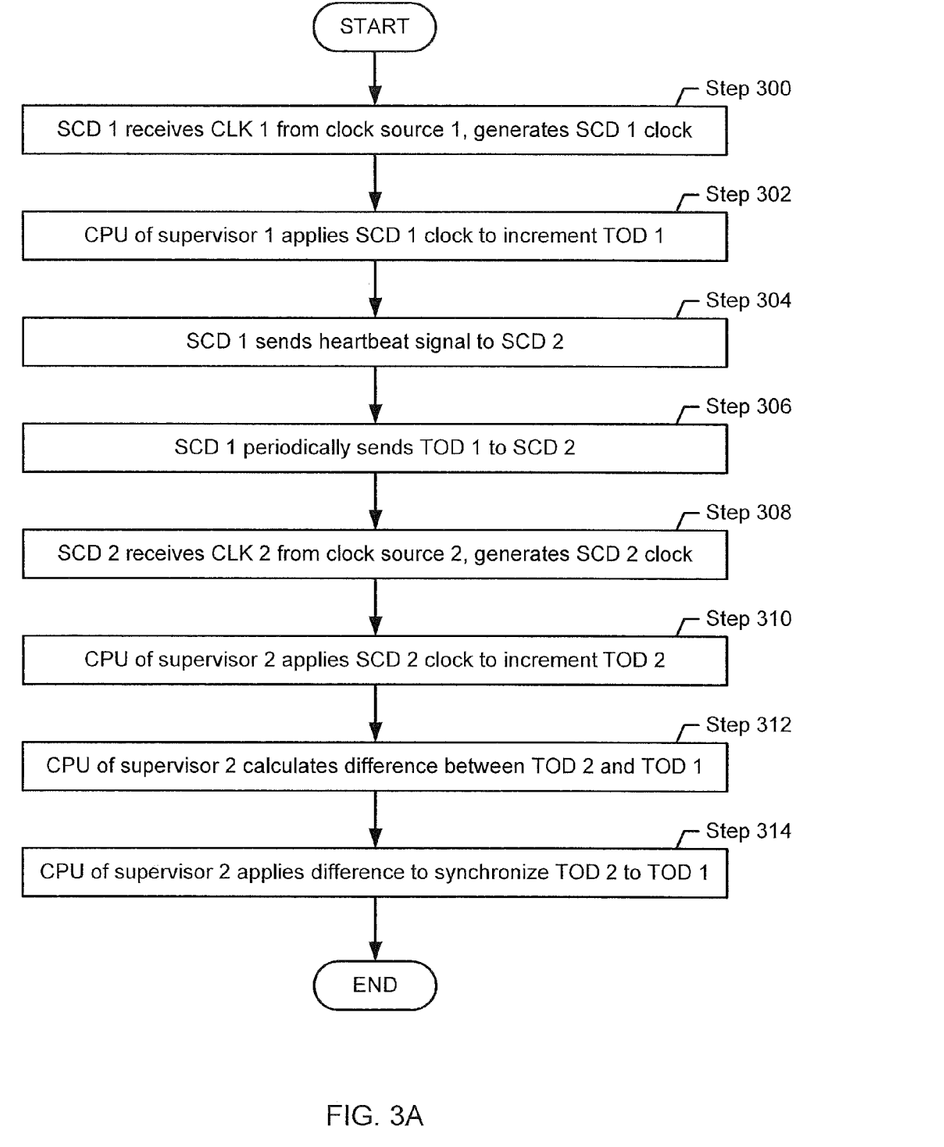
FIGS. 3A and 3B show flowcharts in accordance with one or more embodiments of the invention.
Figure 3B:
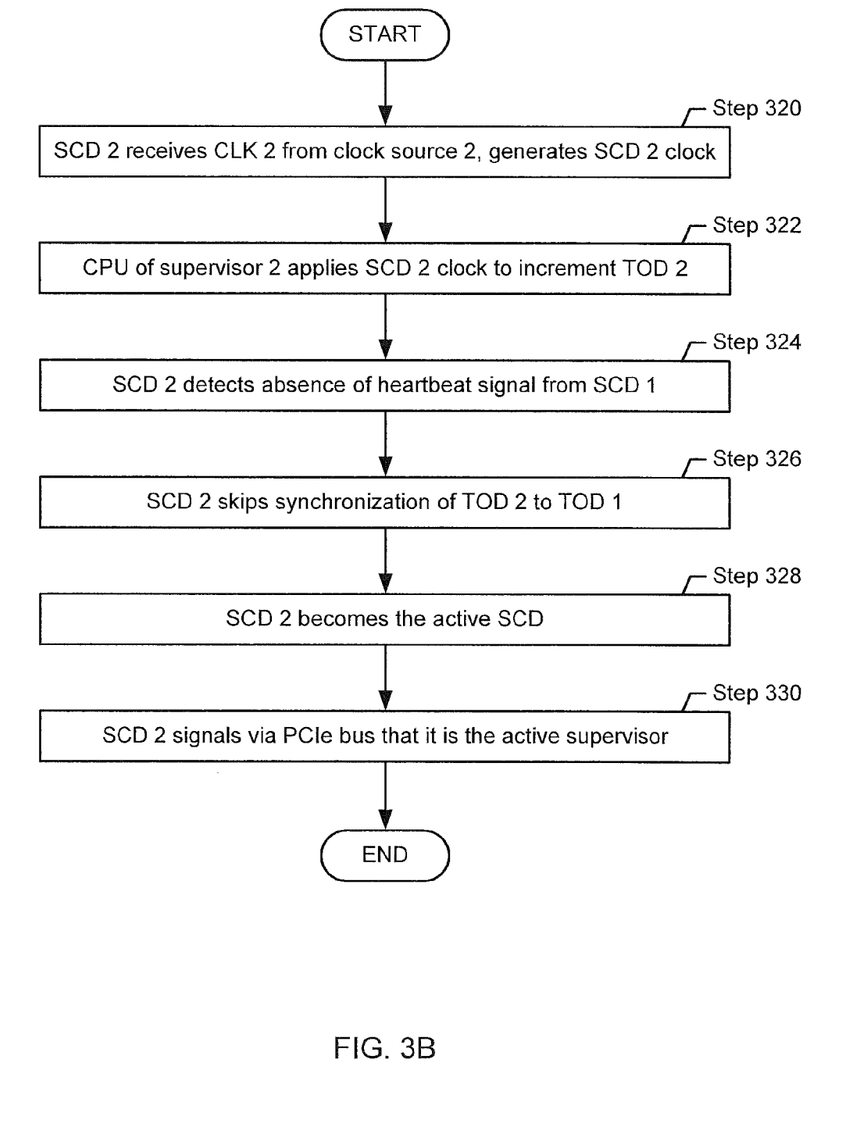
Figure 4A:
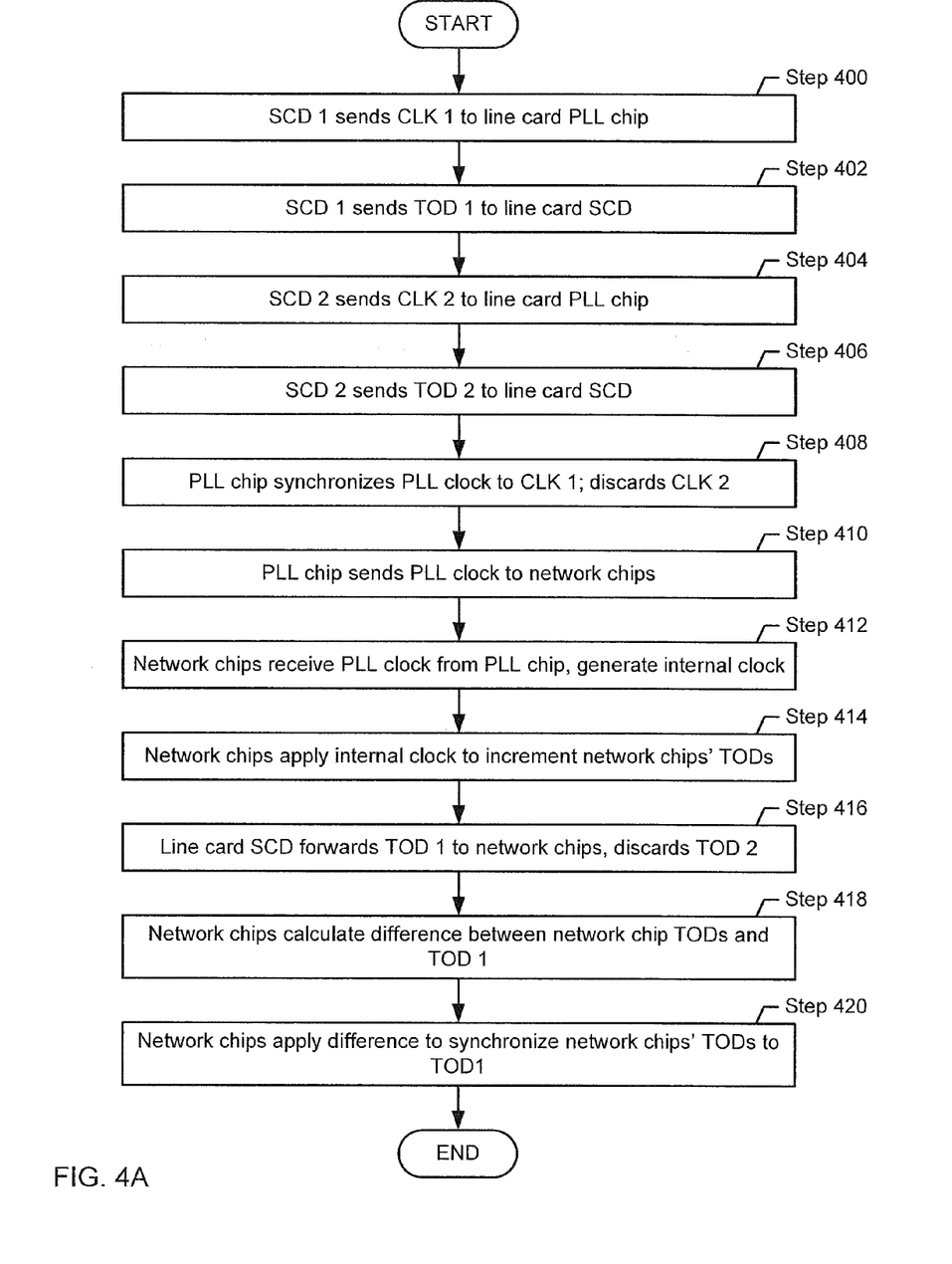
FIGS. 4A and 4B show flowcharts in accordance with one or more embodiments of the invention.
Figure 4B:
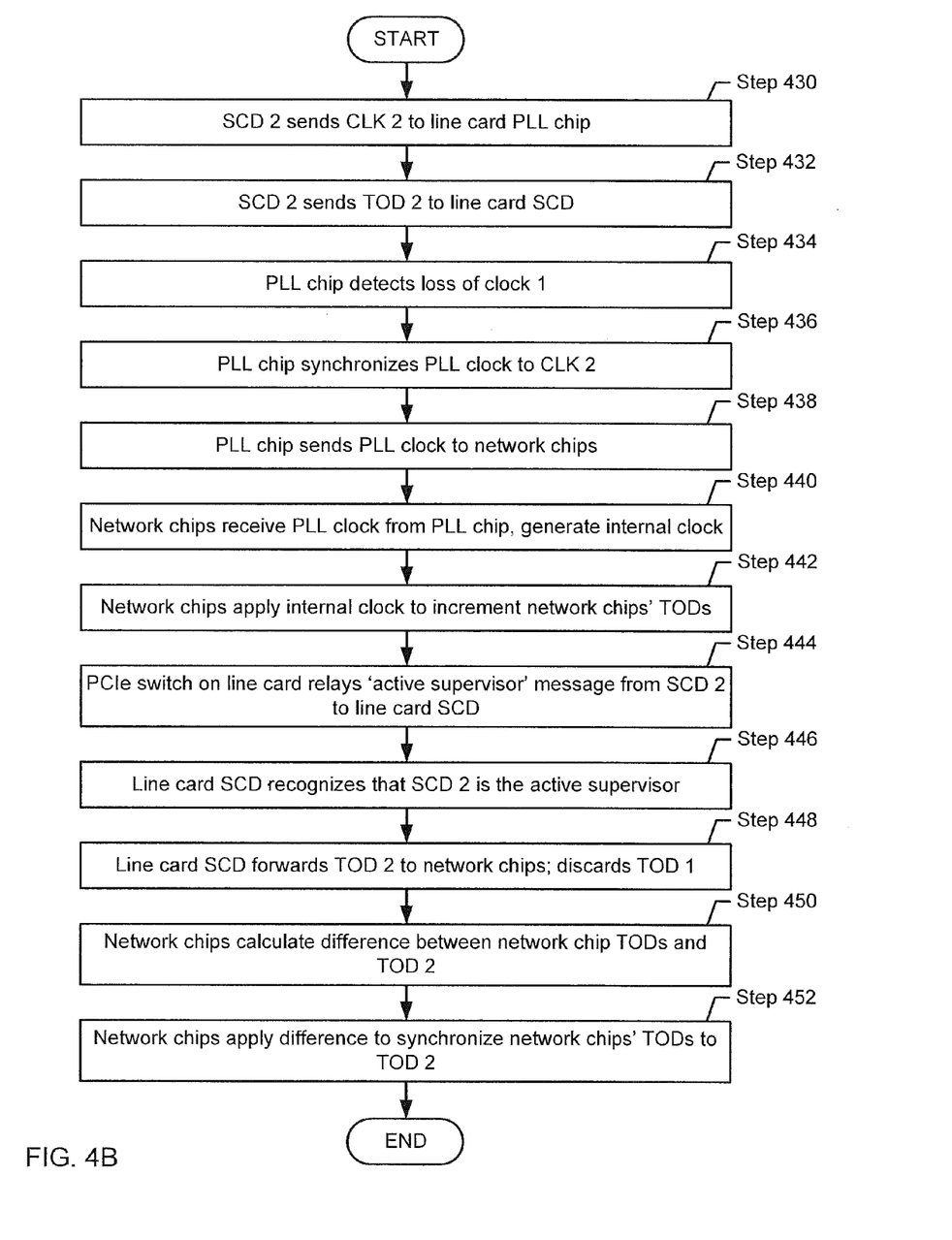

FIGS. 2-4 show flowcharts in accordance with one or more embodiments of the invention. FIG. 2 shows a flowchart providing an overview of a method for distributing an accurate time base to network chips in a network device. FIG. 3 and FIG. 4 show details of different aspects of the method for distributing an accurate time base to network chips in a network device.

While the various steps in the flowcharts are presented and described sequentially, one of ordinary skill will appreciate that some or all of these steps may be executed in different orders, may be combined or omitted, and some or all of the steps may be executed in parallel. In one embodiment of the invention, the steps shown in FIGS. 2-4 may be performed in parallel with any other steps shown in FIGS. 2-4 without departing from the invention.

FIG. 2 shows a method for distributing an accurate time base to network chips in a network device. In one or more embodiments of the invention, two redundant system control devices (SCD 1, SCD 2) each provide a time base. In one embodiment of the invention, SCD 1 may be the default active SCD, i.e. the primary time source, and SCD 2 may be the backup time source that may become the active SCD if SCD 1 fails. The time bases generated by SCD 1 and SCD 2 are distributed throughout the network device. The network chips of the network device synchronize to the time base provided by the active SCD.

Turning to FIG. 2, in Step 200, a determination is made about whether SCD 1 has failed. SCD 2 monitors a periodic heartbeat signal sent by SCD 1. If SCD 2 does not receive the periodic heart signal from SCD 1, SCD 2 concludes that SCD 1 has failed. If SCD 2 receives the periodic heartbeat signal from SCD 1, SCD 2 concludes that SCD 1 is operational, and the method may proceed to Step 202.

In Step 202, the CPU of supervisor 2 synchronizes the time base of SCD 2 to the time base received from SCD 1. The time base of SCD 2 therefore mirrors (or almost mirrors) the time base of SCD 1. The details of Step 202 are described in FIG. 3A.

In Step 204, the network chips synchronize to the time base provided by the active SCD. Because SCD 1 is the active SCD, the network chips synchronize to the time base provided by SCD 1. The details of Step 204 are described in FIG. 4A.

Returning to Step 200, if a determination is made that SCD 1 has failed, the method may proceed to Step 206.

In Step 206, SCD 2 becomes the active SCD. The details of Step 206 are described in FIG. 3B.

In Step 208, the network chips synchronize to the time base provided by the active SCD. Because SCD 2 is the active SCD, the network chips synchronize to the time base provided by SCD 2. The details of Step 208 are described in FIG. 4B.

FIG. 3A shows a method for controlling the interaction between two redundant system control devices (SCD 1, SCD 2). Both system control devices (SCDs) provide a time base to the line card(s) of the network device. One system control device is the active SCD, the other system control device is a backup SCD and synchronizes its time base to the time base of the active SCD. In the embodiment described in FIG. 3A, SCD 1 is the default active SCD, and SCD 2 is the backup SCD.

Turning to FIG. 3A, in Step 300, SCD 1 receives a clock signal CLK 1 from clock source 1. In one or more embodiments of the invention, SCD 1 may include a clock multiplier to derive a higher-frequency clock signal from the crystal oscillator clock signal. For example, a crystal oscillator may generate a 25 MHz clock signal CLK 1. The clock multiplier may use this 25 MHz clock signal from the crystal oscillator to generate a 250 MHz SCD 1 clock signal that may serve as the clock used to generate the time base of SCD 1.

In Step 302, the CPU of supervisor 1 generates a time of day 1 (TOD 1) for SCD 1. The CPU of supervisor 1 uses the SCD 1 clock to increment TOD 1 with each clock tick. For example, in one embodiment where the SCD 1 clock is 250 MHz, TOD 1 is incremented periodically by 4 nanoseconds every 4 nanoseconds.

In Step 304, SCD 1 sends a periodic hardware-generated heartbeat signal to SCD 2. The heartbeat signal from SCD 1 indicates regular operation of SCD 1. SCD 1 therefore remains the active SCD, and SCD 2 remains the backup SCD.

In Step 306, SCD 1 periodically sends TOD 1 to SCD 2. In one embodiment of the invention, SCD 1 may send TOD 1 to SCD 2 approximately once per second.

In Step 308, SCD 2 receives a clock signal CLK 2 from clock source 2. In one or more embodiments of the invention, SCD 2 may include a clock multiplier to derive a higher-frequency clock signal from the crystal oscillator clock signal. For example, a crystal oscillator may generate a 25 MHz clock signal CLK 2. The clock multiplier may use this 25 MHz clock signal from the crystal oscillator to generate a 250 MHz SCD 2 clock signal that may serve as the clock used to generate the time base of SCD 2.

In Step 310, the CPU of supervisor 2 generates a time of day 2 (TOD 2) for SCD 2. The CPU of supervisor 2 uses the SCD 2 clock to increment TOD 2 with each clock tick. For example, in one embodiment where the SCD 2 clock is 250 MHz, TOD 2 is incremented periodically by 4 nanoseconds every 4 nanoseconds.

In Step 312, the CPU of supervisor 2 calculates the time offset between TOD 2 of SCD 2 and TOD 1 received from SCD 1 in Step 306. For example, "TOD 2−TOD 1" may be positive if TOD 2 is ahead of TOD 1, and "TOD 2−TOD 1" may be zero if both TODs are in synchrony.

In Step 314, the CPU of supervisor 2 applies the difference obtained in Step 312 to synchronize TOD 2 to TOD 1, if necessary. In one or more embodiments of the invention, without synchronization there may be a small offset and/or drift between TOD 2 and TOD 1 because TOD 1 and TOD 2 are derived from accurate but independent time sources. TOD 2 is synchronized to TOD 1 by adjusting the size of the increment applied in Step 310. For example, if "TOD 2−TOD 1" indicates that TOD 2 is ahead of TOD 1, the increment size may be reduced to below 4 nanoseconds. The slowed-down TOD 2 update causes TOD 2 to converge to TOD 1.

FIG. 3B shows a method for making system control device 2 (SCD 2) the active SCD when the system control device 1 (SCD 1) has failed. Only SCD 2 provides a time base to the line card(s) of the network device if SCD 1 has failed.

Turning to FIG. 3B, in Step 320, SCD 2 receives a clock signal CLK 2 from clock source 2. In one embodiment of the invention, the clock source may be a crystal oscillator that generates a fixed frequency clock signal. In one or more embodiments of the invention, SCD 2 may include a clock multiplier to derive a higher-frequency clock signal from the crystal oscillator clock signal. For example, a crystal oscillator may generate a 25 MHz clock signal CLK 2. The clock multiplier may use this 25 MHz clock signal from the crystal oscillator to generate a 250 MHz SCD 2 clock signal that may serve as the clock used to generate the time base of SCD 2.

In Step 322, the CPU of supervisor 2 generates a time of day 2 (TOD 2) for SCD 2. The CPU of supervisor 2 uses the SCD 2 clock to increment TOD 2 with each clock tick. For example, in one embodiment where the SCD 2 clock is 250 MHz, TOD 2 is incremented periodically by 4 nanoseconds every 4 nanoseconds.

In Step 324, SCD 2 detects the absence of the periodic hardware-generated heartbeat signal generated by SCD 1.

In Step 326, SCD 2 skips the synchronization of TOD 2 to TOD 1. TOD 2 therefore does not depend from TOD 1.

In Step 328, SCD 2 becomes the active SCD.

In Step 330, SCD 2 communicates to the line card(s), via the PCIe bus, that SCD 2 is the new active SCD. This message instructs the line card(s) to use the time base provided by SCD 2, instead of using the time base from the failing SCD 1.

FIG. 4A shows a method for sending the time base of the active SCD and the time base of the backup SCD to the line card(s). The line card(s) distribute(s) the time base of the active SCD to the network chips. In the embodiment shown in FIG. 4A, system control device 1 (SCD 1) is the active supervisor. Therefore, the time base generated by SCD 1 is distributed to the network chips.

Turning to FIG. 4A, in Step 400, SCD 1 sends clock signal CLK 1 to the line card PLL chip(s).

In Step 402, SCD 1 sends a pulse signal, Sync 1, followed by TOD 1 to the line card system control device(s) (LC-SCD). TOD 1 indicates the time of day when the Sync 1 pulse was sent by SCD 1. In one embodiment of the invention, for example, Sync 1 and TOD 1 may be sent approximately once per second.

In Step 404, SCD 2 sends clock signal CLK 2 to the line card PLL chip(s).

In Step 406, SCD 2 sends a pulse signal, Sync 2, followed by TOD 2 to the line card system control device(s) (LC-SCD). TOD 2 indicates the time of day when the Sync 2 pulse was sent by SCD 2. In one embodiment of the invention, for example, Sync 2 and TOD 2 may be sent approximately once per second.

In Step 408, the PLL chip generates a clock signal that is synchronized to the clock signal provided by the default active SCD. In the embodiment shown in FIG. 4A, SCD 1 is the active SCD, and the PLL chip therefore synchronizes the PLL chip-generated clock to CLK 1. The PLL chip also receives CLK 2 from SCD 2, but discards CLK 2.

In Step 410, the PLL chip sends the PLL chip-generated clock to the network chips. Because the PLL chip-generated clock is synchronized to CLK 1, the network chips receive CLK 1.

In Step 412, each network chip receives CLK 1. In one or more embodiments of the invention, each network chip may include an internal clock multiplier. In one of the embodiments, for example, CLK 1 may be a 25 MHz clock, and the network chips may use CLK 1 to derive an internal 250 MHz network chip clock.

In Step 414, each network chip updates its internal network chip-specific time of day value (NC-TOD). The network chip updates its NC-TOD by incrementing the NC-TOD with each clock tick of the network chip clock generated in Step 412. For example, in one embodiment where the network chip clock is 250 MHz, the NC-TOD may be incremented periodically by 4 nanoseconds every 4 nanoseconds. The size of the increment may be increased to above 4 nanoseconds or it may be decreased to below 4 nanoseconds to increase or decrease the update rate of the NC-TOD, if necessary.

In Step 416, the line card system control device (LC-SCD) sends a sync pulse and a time of day to the network chips. As previously discussed, in Step 402, SCD 1 sends Sync 1 and TOD 1 to the LC-SCD, and in Step 406, SCD 2 sends Sync 2 and TOD 2 to the LC-SCD. The LC-SCD selects the sync pulse and the time of day provided by the active SCD for distribution to the network chips. With SCD 1 being the active SCD, the LC-SCD forwards Sync 1 and TOD 1 to the network chips, and discards Sync 2 and TOD 2. In one embodiment of the invention, Sync 1 may be sent periodically, for example, approximately once per second, followed by TOD 1.

In Step 418, each network chip calculates a time offset between the internally maintained network chip time of day (NC-TOD), and TOD 1, received from the LC-SCD. For example, "NC-TOD−TOD 1" may be positive if the NC-TOD is ahead of TOD 1, and "NC-TOD−TOD 1" may be zero if both TODs are in synchrony.

In Step 420, each network chip applies the difference obtained in Step 418 to synchronize the network chip's NC-TOD to TOD 1, if necessary. The NC-TOD is synchronized to TOD 1 by adjusting the size of the increment applied in Step 414. For example, if "NC-TOD−TOD 1" indicates that the NC-TOD is ahead of TOD 1, the size of the increment may be reduced to below 4 nanoseconds. The slowed-down NC-TOD update causes NC-TOD to converge to TOD 1.

FIG. 4B shows a method for sending the time base of the new active SCD to the line card(s) when the default active SCD has failed. The line card(s) distribute the time base of the active SCD to the network chips. In the embodiment shown in FIG. 4B, system control device 2 (SCD 2) is the new active SCD replacing the default active SCD, SCD 1. Therefore, the time base generated by SCD 2 is distributed to the network chips.

Turning to FIG. 4B, in Step 430, SCD 2 sends clock signal CLK 2 to the line card PLL chip(s).

In Step 432, SCD 2 sends a pulse signal, Sync 2, followed by TOD 2 to the line card system control device(s) (LC-SCD). The TOD 2 value sent indicates the time of day when the Sync 2 pulse was sent by SCD 2. In one embodiment of the invention, for example, Sync 2 and TOD 2 may be sent approximately once per second.

In Step 434, the PLL chip detects the absence of CLK 1 normally provided by SCD 1.

In Step 436, the PLL chip generates a clock signal that is synchronized to CLK 2 provided by SCD 2. In the embodiment shown in FIG. 4B, in absence of CLK 1 from the default active SCD, SCD1, the PLL considers CLK 2, provided by the alternative clock source, and synchronizes the PLL chip-generated clock to CLK 2.

In Step 438, the PLL chip sends the PLL chip-generated clock to the network chips. Because the PLL chip-generated clock is synchronized to CLK 2, the network chips receive CLK 2.

In Step 440, each network chip receives CLK 2.

In Step 442, each network chip updates its internal network chip-specific time of day value (NC-TOD). The network chip updates its NC-TOD by incrementing the NC-TOD with each clock tick of the network chip clock generated in Step 440. For example, in one embodiment where the network chip clock is 250 MHz, the NC-TOD may be incremented periodically by 4 nanoseconds every 4 nanoseconds. The size of the increment may be increased to above 4 nanoseconds or it may be decreased to below 4 nanoseconds to increase or decrease the update rate of the NC-TOD, if necessary.

In Step 444, the PCIe switch of the line card relays the active SCD message from SCD 2, sent by SCD 2 in Step 330 (see FIG. 3B) to the LC-SCD to inform the LC-SCD about SCD 2 being the new active SCD.

In Step 446, the LC-SCD recognizes that SCD 2 is the new active SCD providing the TOD.

In Step 448, the LC-SCD sends a sync pulse and a time of day to the network chips. As previously discussed, in Step 432, SCD 2 sends Sync 2 and TOD 2 to the LC-SCD. The LC-SCD selects the sync pulse and the time of day provided by the active SCD for distribution to the network chips. With SCD 2 being the active SCD, the LC-SCD forwards Sync 2 and TOD 2 to the network chips. In one embodiment of the invention, Sync 2 may be sent periodically, for example, approximately once per second, followed by TOD 2. TOD 2 indicates the time of day when Sync 2 was generated by SCD 2.

In Step 450, each network chip calculates the time offset between the internally maintained network chip time of day (NC-TOD) and TOD 2 received from the LC-SCD. For example, "NC-TOD−TOD 2" may be positive if NC-TOD is ahead of TOD 2, and "NC-TOD−TOD 2" may be zero if both TODs are in synchrony.

In Step 452, each network chip applies the difference obtained in Step 450 to synchronize the network chip's NC-TOD to TOD 2, if necessary. The NC-TOD is synchronized to TOD 2 by adjusting the size of the increment applied in Step 442. For example, if "NC-TOD−TOD 2" indicates that the NC-TOD is ahead of TOD 2, the size of the increment may be reduced to below 4 nanoseconds. The slowed-down NC-TOD update causes NC-TOD to converge to TOD 2.

Embodiments of the invention may provide a single, universal, precise and redundant time base that is distributed throughout the network device. Having all network chips in a network device rely on the same time base enables, for example, accurate timing-related operations such as timestamping and/or latency measurement, even if such an operation requires time information from multiple network chips. Furthermore, the method is robust due to redundant system control devices, and allows reconstruction of full-resolution time of day information from nanosecond-resolution time stamps applied by the network chips that do not include full-resolution time of day.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for distributing time information in network devices, the method comprising:
   sending a first clock signal from a first system control device (SCD) to a phase locked loop (PLL);
   sending a first time of day (TOD) from the first SCD to a line card system control device (LC-SCD) on a line card;
   sending a second clock signal from a second SCD to the PLL chip;
   sending a second TOD from the second SCD to the LC-SCD;
   synchronizing a third clock signal, generated by the PLL chip, to the first clock signal, wherein the first system control device is operational;
   sending the third clock signal to at least one network chip of a plurality of network chips;
   deriving, using the third clock signal, a first network-chip-internal clock signal on the at least one network chip;
   applying the first network-chip-internal clock signal to increment a network-chip-internal TOD on the at least one network chip to obtain a third TOD;
   sending, from the LC-SCD, the first TOD to the at least one network chip;
   calculating, by the at least one network chip, a first difference between the third TOD and the first TOD; and
   applying the first difference to synchronize the third TOD to the first TOD.

2. The method of claim 1, further comprising:
   detecting, by the PLL chip, a loss of the first clock signal;
   based on the detecting and after applying the first difference:
      synchronizing the third clock signal, generated by the PLL chip, to the second clock signal to obtain a fourth clock signal, wherein the first SCD is not operational;
      sending the fourth clock signal to the at least one network chip;
      deriving, using the fourth clock signal, a second network-chip-internal clock for the at least one network chip;

applying the second network-chip-internal clock signal to increment the network-chip-internal TOD on the at least one network chip to obtain a fourth TOD;

notifying the LC-SCD, by the second SCD, that the first SCD is not operational;

sending, by the LC-SCD, the second TOD to the at least one network chip;

calculating a second difference between the fourth TOD and the second TOD; and applying the second difference to synchronize the fourth TOD to the second TOD.

3. The method of claim 1, further comprising:
synchronizing the second TOD to the first TOD.

4. The method of claim 1, further comprising:
sending a periodic heartbeat signal from the first SCD to the second SCD.

5. The method of claim 1 further comprising:
measuring a first propagation delay for the first TOD from the first SCD to the at least one network chip; and
using the measured first propagation delay to compensate for the first propagation delay when the first network-chip-internal TOD is returned to the first SCD.

6. The method of claim 1,
wherein the first SCD maintains the first TOD using two counters; and
wherein the second SCD maintains the second TOD using two counters; and
wherein the at least one network chip maintains the first network-chip-internal TOD using one counter.

7. The method of claim 2, wherein notifying the LC-SCD comprises using the PCIe protocol.

8. A network device, the network device comprising:
a first system control device (SCD);
a second SCD;
a phase locked loop (PLL);
a line card system control device (LC-SCD);
a plurality of network chips; and
a plurality of ports,
wherein the first SCD sends a first clock signal to the PLL chip;
wherein the first SCD sends a first time of day (TOD) to the LC-SCD on a line card;
wherein the second SCD sends a second clock signal to the PLL chip;
wherein the second SCD sends a second TOD to the LC-SCD;
wherein the PLL chip generates a third clock signal and synchronizes the third clock signal to the first clock signal, wherein the first system control device is operational;
wherein the PLL chip sends the third clock signal to at least one network chip of the plurality of network chips;
wherein the at least one network chip derives, using the third clock signal, a first network-chip-internal clock signal; and
wherein applies the first network-chip-internal clock signal to increment a network-chip-internal TOD to obtain a third TOD;
wherein the LC-SCD sends the first TOD to the at least one network chip;

wherein the at least one network chip calculates a first difference between the third TOD and the first TOD; and
wherein the at least one network chip applies the first difference to the third TOD in order to synchronize the third TOD to the first TOD.

9. The network device of claim 8, wherein the network device further:
detects, by the PLL chip, a loss of the first clock signal; and
based on the detecting and after applying the first difference:
synchronizes the third clock signal, generated by the PLL chip, to the second clock signal to obtain a fourth clock signal, wherein the first SCD is not operational;
sends the fourth clock signal to the at least one network chip;
derives, using the fourth clock signal, a second network-chip-internal clock for the at least one network chip;
applies the second network-chip-internal clock signal to increment the network-chip-internal TOD on the at least one network chip to obtain a fourth TOD;
notifies the LC-SCD, by the second SCD, that the first SCD is not operational;
sends, by the LC-SCD, the second TOD to the at least one network chip;
calculates a second difference between the fourth TOD and the second TOD; and
applies the second difference to synchronize the fourth TOD to the second TOD.

10. The network device of claim 8, wherein the network device further:
synchronizes the second TOD to the first TOD.

11. The network device of claim 8, wherein the first SCD further:
sends a periodic heartbeat signal to the second SCD.

12. The network device of claim 8, wherein the network device further:
measures a first propagation delay for the first TOD from the first SCD to the at least one network chip; and
uses the measured first propagation delay to compensate for the first propagation delay when the first network-chip-internal TOD is returned to the first SCD.

13. The network device of claim 8,
wherein the first SCD further maintains the first TOD using two counters; and
wherein the second SCD further maintains the second TOD using two counters; and
wherein the LC-SCD further maintains the line card system TOD using one counter; and
wherein the at least one network chip further maintains the first network-chip-internal TOD using one counter.

14. The network device of claim 9, wherein notifying the LC-SCD comprises using the PCIe protocol.

15. The network device of claim 9, wherein notifying the LC-SCD comprises using a PCIe bus.

16. The network device of claim 8, wherein the network device is a switch.

17. The network device of claim 8, wherein the network device is a multilayer switch.

18. The network device of claim 8, wherein the network device is a router.

* * * * *